(12) United States Patent
Chuang et al.

(10) Patent No.: US 10,097,848 B2
(45) Date of Patent: Oct. 9, 2018

(54) METHODS FOR PALETTE SIZE SIGNALING AND CONDITIONAL PALETTE ESCAPE FLAG SIGNALING

(71) Applicant: HFI Innovation Inc., Zhubei, Hsinchu County (TW)

(72) Inventors: Tzu-Der Chuang, Zhubei (TW); Yu-Chen Sun, Keelung (TW); Yi-Wen Chen, Taichung (TW); Shan Liu, San Jose, CA (US)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/312,420

(22) PCT Filed: May 22, 2015

(86) PCT No.: PCT/CN2015/079568
§ 371 (c)(1),
(2) Date: Nov. 18, 2016

(87) PCT Pub. No.: WO2015/176685
PCT Pub. Date: Nov. 26, 2015

(65) Prior Publication Data
US 2017/0127077 A1    May 4, 2017

Related U.S. Application Data

(63) Continuation-in-part of application No. PCT/CN2014/087082, filed on Sep. 22, 2014.
(Continued)

(51) Int. Cl.
*H04N 19/46* (2014.01)
*H04N 19/186* (2014.01)
*H04N 19/70* (2014.01)

(52) U.S. Cl.
CPC .......... *H04N 19/46* (2014.11); *H04N 19/186* (2014.11); *H04N 19/70* (2014.11)

(58) Field of Classification Search
CPC ..................................................... H04N 19/46
See application file for complete search history.

(56) References Cited

U.S. PATENT DOCUMENTS

| 2013/0121423 | A1  | 5/2013  | Gamei et al. |
| 2015/0264363 | A1* | 9/2015  | Pu ........................ H04N 19/186 375/240.02 |
| 2015/0326864 | A1* | 11/2015 | Lainema .............. H04N 19/103 375/240.02 |

FOREIGN PATENT DOCUMENTS

| CN | 103096074 | 5/2013 |
| EP | 2 955 919 A2 | 12/2015 |

(Continued)

OTHER PUBLICATIONS

Guo et al., Evaluation of Palette Mode Coding on HM-12.0+RExt-4.1, JCTVC-O0218, Oct. 23-Nov. 1, 2013.*
(Continued)

*Primary Examiner* — Tung Vo
*Assistant Examiner* — Rowina Cattungal
(74) *Attorney, Agent, or Firm* — McClure, Qualey & Rodack, LLP

(57) ABSTRACT

Methods for palette coding of image and video data to avoid issues associated with zero-size palette or to improve performance by conditionally signaling CU (coding unit)-level escape pixel presence flag are disclosed. In one embodiment, size information related to palette size of a current palette table of the current CU is signaled conditionally based on the escape indication flag, where the escape indication flag indicates whether there is any sample in the current CU coded as an escape pixel. In another embodiment, the CU-level escape pixel presence flag is conditionally signaled
(Continued)

according to the current palette size or both of the predicted palette size and the new palette size. Conditionally signaling the palette sharing flag may also be based on the palette sharing flag.

16 Claims, 3 Drawing Sheets

Related U.S. Application Data

(60) Provisional application No. 62/040,020, filed on Aug. 21, 2014, provisional application No. 62/035,625, filed on Aug. 11, 2014, provisional application No. 62/030,714, filed on Jul. 30, 2014, provisional application No. 62/014,959, filed on Jun. 20, 2014, provisional application No. 62/002,221, filed on May 23, 2014.

(56) References Cited

FOREIGN PATENT DOCUMENTS

| EP | 3 007 442 A1 | 4/2016 |
|---|---|---|
| WO | WO 2015/006724 | 1/2015 |
| WO | 2015103390 A1 | 7/2015 |
| WO | 2015179803 A1 | 11/2015 |
| WO | WO 2016/044974 A1 | 3/2016 |

OTHER PUBLICATIONS

Pu et al., Non-RCE4: Refinement of the palette in RCE4 Test 2, Jan. 9-17, 2014.*

Xiu et al., Description of screen content coding technology proposal by Inter Digital, Mar. 27-Apr. 4, 2014.*

Pu, W. et al.; "Non-RCE4: Refinement of the palette in RCE4 Test 2;" Joint Collaborative Team on Video Coding (JCT-VC) of ITU-T SG 16 WP 3 and ISO/IEC JTC 1/SC 29/WG 11; Jan. 2014; pp. 1-4.

Gisquet, C.; "Crosscheck of AHG10: Simplification of Palette Based Coding;" Joint Collaborative Team on Video Coding (JCT-VC) OF ITU-T SG 16 WP 3 and ISO/IEC JTC 1/SC 29/WG 11; Mar.-Apr. 2014; pp. 1-4.

Xiu, X., et al.; "Description of screen content coding technology proposal by InterDigital;" Joint Collaborative Team on Video Coding (JCT-VC) of ITU-T SG 16 WP 3 and ISO/IEC JTC 1/SC 29/WG 11; Mar.-Apr. 2014; pp. 1-30.

Chen, J., et al.; "Description of screen content coding technology proposal by Qualcomm;" Joint Collaborative Team on Video Coding (JCT-VC) of ITU-T SG 16 WP 3 and ISO/IEC JTC 1/SC 29/WG 11; Mar.-Apr. 2014; pp. 1-20.

Pu, W., et al.; "SCCE3: Test B.13 ' Flag to Indicate Escape and Index coding;" Joint Collaborative Team on Video Coding (JCT-VC) of ITU-T SG 16 WP 3 and ISO/IEC JTC 1/SC 29/WG 11; Jun.-Jul. 2014; pp. 1-4.

Joshi, R., et al.; "High Efficiency Video Coding (HEVC) Screen Content Coding: Draft 1;" Joint Collaborative Team on Video Coding (JCT-VC) of ITU-T SG 16 WP 3 and ISO/IEC JTC 1/SC 29/WG 11; Jun.-Jul. 2014; pp. 1-358.

Sullivan, G.J., et al.; "Overview of the High Efficiency Video Coding (HEVC) Standard;" IEEE transactions on circuits and systems for video technology; vol. 22; No. 12; Dec. 2012; pp. 1649-1668.

ITU Series H Audiovisual and Multimedia Systems infrastructure of audiovisual service-Coding of moving video; High efficiency video coding, ITU-T H.265; Apr. 2013; pp. 1-317.

International Search Report and Written Opinion of the International Searching Authority in PCT/CN2015/079568, dated Aug. 18, 2015.

"JCTVC-R0348_18th meeting Final Text Specification;" Jul. 2014; pp. 1-16.

Guo, L., et al.; "RCE3: Results of Test 3.1 on Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-7.

Guo, X., et al.; "AHG8: Major-color-based screen content coding;" Joint Collaborative Team on Video Coding (JCT-VC) of ITU-T SG 16 WP 3 and ISO/IEC JTC 1/SC 29/WG 11; Oct.-Nov. 2013; pp. 1-7.

Bugdayci, D., et al.; "AHG10: Improvements on palette coding;" Joint Collaborative Team on Video Coding (JCT-VC) of ITU-T SG 16 WP 3 and ISO/IEC JTC 1/SC 29/WG 11; Mar.-Apr. 2014; pp. 1-8.

Zhang, K., et al.; "CE6-related: Syntax fixes for zero palette in palette coding;" Joint Collaborative Team on Video Coding (JCT-VC) of ITU-T SG 16 WP 3 and ISO/IEC JTC 1/SC 29/WG 11; Oct. 2014; pp. 1-40.

Pu, W., et al.; "Non-CE6: Syntax Redundancy Fixes for Palette Mode;" Joint Collaborative Team on Video Coding (JCT-VC) of ITU-T SG 16 WP 3 and ISO/IEC JTC 1/SC 29/WG 11; Oct. 2014; pp. 1-56.

He, Y., et al.; "Non-CE6: Redundancy removal and simplification for Palette coding;" Joint Collaborative Team on Video Coding (JCT-VC) of ITU-T SG 16 WP 3 and ISO/IEC JTC 1/SC 29/WG 11; Oct. 2014; pp. 1-26.

"Flag (computing);" Wikipedia; http://en.wikipedia.org/w/index.php?title=Flag_(computing_&oldid=532892388; Feb. 2018; pp. 1.

* cited by examiner

METHODS FOR PALETTE SIZE SIGNALING AND CONDITIONAL PALETTE ESCAPE FLAG SIGNALING

CROSS REFERENCE TO RELATED APPLICATIONS

The present invention claims priority to U.S. Provisional Patent Application, Ser. No. 62/002,221, filed on May 23, 2014, U.S. Provisional Patent Application, Ser. No. 62/014,959, filed on Jun. 20, 2014, U.S. Provisional Patent Application, Ser. No. 62/030,714, filed on Jul. 30, 2014, U.S. Provisional Patent Application, Ser. No. 62/035,625, filed on Aug. 11, 2014, U.S. Provisional Patent Application, Ser. No. 62/040,020, filed on Aug. 21, 2014 and is a Continuation-In Part of PCT Patent Application, Serial No. PCT/CN2014/087082, filed on Sep. 22, 2014. The U.S. Provisional Patent Applications and PCT Patent Application are hereby incorporated by reference in their entireties.

TECHNICAL FIELD

The present invention relates to color index coding for video data. In particular, the present invention discloses ways to resolve the issues when the palette size being zero.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred to as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "RCE3: Results of Test 3.1 on Palette Mode for Screen Content Coding", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "Evaluation of Palette Mode Coding on HM-12.0+RExt-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1, Nov. 2013, Document: JCTVC-O0218). In JCTVC-N0247, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table size is first transmitted followed by the palette elements.
2. Transmission of pixel values: the pixels in the CU are encoded in a raster scan order. For each group of one or more pixels, a flag for a run-based mode is first transmitted to indicate whether the "run" mode or "copy above" mode is being used.
   2.1 "run" mode: In the "run" mode, a palette index is first signaled followed by "palette_run" (e.g., M) representing the run value. The run value indicates that a total of M samples are all coded using "run" mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.
   2.2 "copy above" mode: In the "copy above" mode, a value "copy_run" (e.g., N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

In the original version of the work disclosed in JCTVC-N0247, palette of each component are constructed and transmitted. The palette can be predicted (shared) from its left neighboring CU to reduce the bitrate. In JCTVC-O0218, each element in the palette is a triplet, representing a specific combination of the three color components. The predictive coding of palette across CU is removed.

Yet another major color-base coding (color index coding) method is disclosed by Guo et al. in JCTVC-O0182 (Guo et al., "AHG8: Major-color-based screen content coding", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1, Nov. 2013, Document: JCTVC-O0182). According to JCTVC-O0182, the palette of each component are constructed and transmitted. However, instead of predicting the entire palette from the left CU, individual entry in a palette can be predicted from the exact corresponding palette entry in the above CU or left CU.

According to JCTVC-O0182, a predictive coding method is applied on the indices for transmission of pixel values, where a pixel line can be predicted by different modes. In specific, three kinds of line modes are used for a pixel line, i.e. horizontal mode, vertical mode and normal mode. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighboring pixel is used as predictor, and the prediction symbol is transmitted to the decoder. Furthermore, pixels are classified into major color pixels and escape pixels. For major color pixels, the decoder reconstructs the pixel values using the major color indices and palette. For escape pixels, the encoder will further send the pixel values.

Palette Size Signaling

In SCM-2.0 (Joshi et al., *Screen content coding test model 2* (*SCM 2*), Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R1014), the block vector (BV), an improved palette scheme has been included. The improved palette scheme is based on JCTVC-R0348 (Onno et al., *Suggested combined software and text for run-based palette mode*, Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R0348). In SCM-2.0, the size of the palette is set as the size of the predicting palette and the size of the transmitted palette size. The predicting palette is a palette derived from the previously reconstructed palette coded CUs. When the current CU is coded as the palette mode, those palette colors that are not predicted by the predicting palette are directly transmitted in the bitstream. For example, if the current CU is coded as the palette mode with a palette size equal to six, three of the six major colors are predicted from the predicting palette and three are directly transmitted through the bitstream, the transmitted three can be signaled using the sample syntax as shown below.

palette_num_signalled_entries=3
 for (cIdx=0; cIdx<NumComp; cIdx++)
 for (i=0; i<palette_num_signalled_entries; i++)
 palette_entries[cIdx][numPredPreviousPalette+i]

Since the palette size is six in this example, the palette index from 0 to 5 is used to indicate each palette coded pixel that can be reconstructed as the major color in the palette color table. In the above pseudo codes, palette_num_signalled_entries indicates the number of entries being signaled. The first loop with loop index cIdex corresponds to the loop for each color component for NumComp color component. The second loop with loop index i corresponds to the loop for palette entries signaled.

In SCM-2.0, to indicate that a pixel is coded as an escape pixel, the color index for the escape pixel is signaled as the value equal to the palette size. When escape pixels is coded in a palette coded block, the palette size of that block can be increased by one and the last major color index can be used as the index of escape pixels according to one exemplary implementation. In the above example, the major color index six indicates that this pixel is an escape pixel. Moreover, in SCM-2.0, one CU-level escape flag, palette_escape_val_present_flag, is signaled for each palette CU to indicate whether escape pixels indexing is coded for this palette CU.

Removing the redundancy of the major color index is another coding tool in SCM-2.0, which also affects the palette size. When the left pixel is coded as normal mode with runs and the left pixel is not escape pixel, it can be assumed that current pixel is not equal to the major color index of the left pixel. Otherwise, the current pixel would be merged to the run coding of the left pixel. In another case, when the left pixel is coded in the run of copy-above mode and the above pixel is not an escape pixel, it can be assumed that current pixel is not equal to the major color index of the above pixel. Otherwise, the current pixel would be merged to the copy-above run coding of the left pixel. In SCM-2.0, in order to remove the redundancy in the above mentioned cases, the major color of the left pixel (or the major color of the above pixel) can be removed from the palette table when coding current pixel. In the cases, the palette size could be regarded as the original size decreased by one. Note that, when the left pixel is coded as copy-above mode and the above pixel is an escape pixel or when the left pixel is coded as run mode and the left pixel is an escape pixel, the value of the above/left pixel (i.e., escape index) cannot be removed from the palette color table for coding current pixel, and the palette size cannot be decreased by one.

According to existing color palette coding as described in HEVC range extensions (RExt), the palette size derived or received may be equal to 0. Since the cases of palette size being equal to 0 are meaningless, the issue of zero-size palette needs to be resolved to avoid possible system problem related to zero-size palette. It is desirable to develop methods to overcome the issues associated with the zero-size palette table.

SUMMARY

A method for palette coding of image and video data to avoid issues associated with zero-size palette is disclosed. According to embodiments of the present invention, size information related to palette size of a current palette table of the current CU is signaled conditionally based on the escape indication flag, where the escape indication flag indicates whether there is any sample in the current CU coded as an escape pixel. For example, if the escape indication flag is not asserted, a syntax palette_size_minus_one signaled for the current palette table of the current CU can be limited to a range from 0 to a maximum palette size minus one inclusive, where the syntax palette_size_minus_one indicates a current palette size of the current palette table minus one. In this case, the current palette size can be reconstructed according to (palette_size_minus_one+1).

The current palette table can be predicted using a palette prediction. The entries of the current palette that cannot be predicted by the palette predictor are transmitted using a new palette table. In another embodiment, if the escape indication flag is not asserted and the predicted palette size indicating the number of entries of the current palette table being predicted by the palette predictor is zero, then the new palette size of the new palette table is restricted to be greater than 0. For example, a size syntax representing the new palette size minus one can be signaled for the current palette table. Accordingly, the actual new palette size can be determined based on the size syntax parsed from a bitstream plus one. In an alternative implementation, the actual new palette size can be determined based on the size syntax parsed from a bitstream plus (numPredPreviousPalette==0 && palette_escape_val_present_flag==0), where numPredPreviousPalette corresponds to the syntax representing the predicted palette size and palette_escape_val_present_flag corresponds to the escape indication flag. In other words, "1" will be added to the parsed size syntax to form the actual new palette size if the predicted palette size is 0 (i.e., numPredPreviousPalette==0) and the escape indication flag is not asserted (i.e., palette_escape_val_present_flag==0). The size syntax can be signaled after the escape indication flag in the bitstream. Alternatively, the predicted palette size can signaled after the escape indication flag in the bitstream.

The palette size of the current palette table of the current CU can be directly restricted to be greater than 1 by an encoder. If a bitstream that may result in a decoded palette size of the current palette table being zero is determined as a non-conforming bitstream.

Another aspect of the present invention addresses conditionally signaling of CU-level escape pixel presence flag. According to embodiments of the present invention, the CU-level escape pixel presence flag is conditionally signaled according to the current palette size or both of the predicted palette size and the new palette size, where the CU-level escape pixel presence flag indicates whether there is any sample in the current CU coded as an escape pixel. For example, the CU-level escape pixel presence flag is not signaled if the current palette size is zero or both the predicted palette size and the new palette size are zero. Alternatively, the CU-level escape pixel presence flag can be inferred as 1. The CU-level escape pixel presence flag may also be constrained to 1 if the current palette size is 0 or both the predicted palette size and the new palette size are 0. The current palette size of the current palette table may be set to 0 if both the predicted palette size and the new palette size are 0.

In yet another embodiment, the CU-level escape pixel presence flag is signaled conditionally according to the palette sharing flag, where the palette sharing flag indicates whether a current palette table of the current CU shares a previous palette table of a last palette-coded CU. The CU-level escape pixel presence flag can be skipped if the palette sharing flag is asserted. In this case, the CU-level escape pixel presence flag can be inferred as the last coded CU-level escape pixel presence flag.

DETAILED DESCRIPTION

Figure 1:
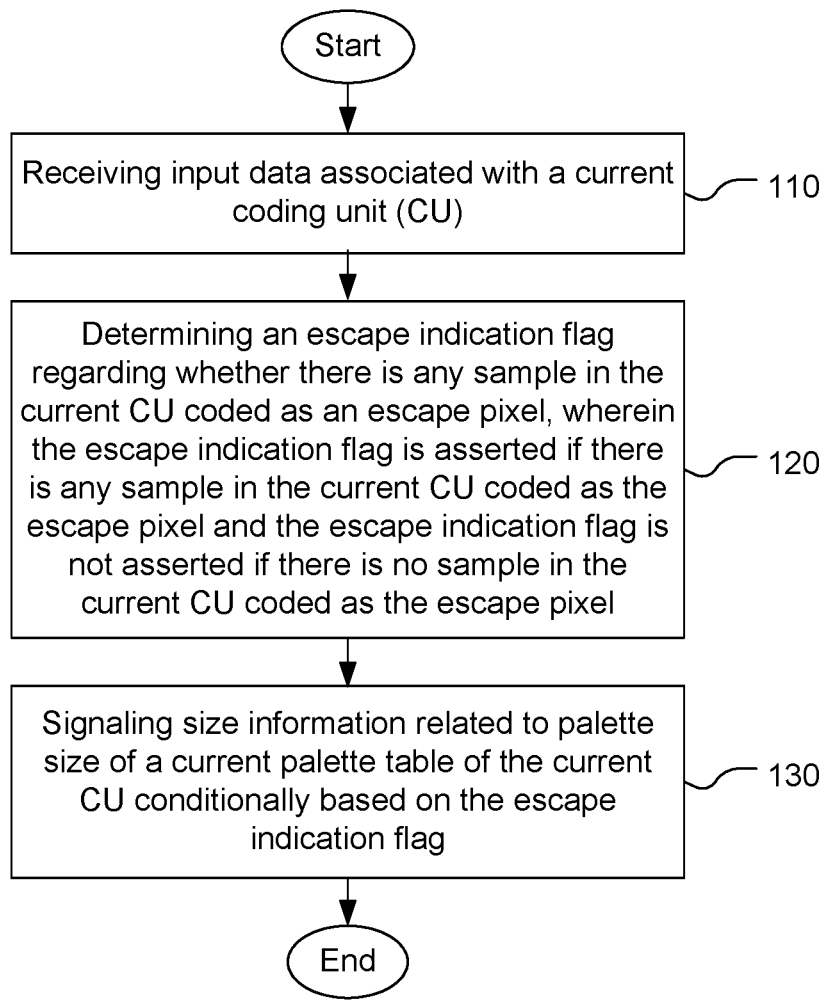
FIG. 1 illustrates an exemplary flowchart of a video coding system incorporating palette coding according to an embodiment of the present invention, where size information related to palette size of a current palette table of the current CU is conditionally signaled based on the escape indication flag.

The following description is of the best-contemplated mode of carrying out the invention. This description is made for the purpose of illustrating the general principles of the invention and should not be taken in a limiting sense. The scope of the invention is best determined by reference to the appended claims.

Various embodiments of the present invention to overcome the issue of zero-palette and to improve the performance of palette prediction coding are disclosed.

Palette Size Restriction

As mentioned before, the palette size of the current palette table determined may be equal to 0. Since the cases of palette size being equal to 0 are meaningless, the issue of zero-size palette needs to be resolved to avoid possible system problem related to zero-size palette.

Various embodiments are disclosed to resolve the zero-size palette issue. In one embodiment, the syntax is designed to restrict the encoder from generating the bitstream that could result in the zero-size palette. For example, a syntax can be used to directly signal the palette size of the current palette table as shown below.

The value of the syntax palette_size_minus_one representing the palette size of the current palette table minus one is restricted to a range from 0 to maximum palette size minus one. The palette size is reconstructed using this syntax as following:

Palette_Size=palette_size_minus_one+1.

In JCTVC-O0218, the encoder will first encode information related to reuse flags to indicate the number of major colors reused in predictor. Then, a new color size (also known as "new palette size") is coded to indicate the number of new colors to be signaled. To avoid the case of zero-size palette, if the reused color size is zero (i.e., the predicted palette size is zero), the same mechanism as described above can be used. In other words, the syntax palette_size_minus_one representing the palette size minus one is restricted to a range from 0 to maximum palette size minus one. The new color size cannot be zero and the new color size minus one is encoded. In other word, the case of new color size equal zero will not be signaled. The decoder firstly checks if the reused color size is zero. If the reused color size is zero, the decoded "new color size" value needs to be increased by one to indict the number of new colors to be decoded.

Another way to avoid the cases of palette size being equal to 0 is to directly restrict the size of the palette from being zero semantically. For example, any bitstream that may result in the palette size of any coding block (e.g., coding unit, prediction unit) being equal to 0 is regarded as non-conforming bitstream.

For the palette prediction flag used in JCTVC-O0218, an additional flag according to an embodiment of the present invention is used to indicate whether all the palette predictors are reused or not. This flag can be signaled before the palette prediction flags.

In JCTVC-N0247 if the palette size is first signaled, then the palette prediction flags are sent. An embodiment of the present invention terminates the prediction flag signaling if the number of the reused palette entries is already equal to the signaled palette size.

The number of signaled prediction flags may depend on the CU size. For example, for an 8×8 CU, not all 32 or 64 palette prediction flags need to be signaled. Therefore, only partial palette prediction flags (e. g., the first 16 (CU width*2) flags) can be signaled.

Conditional Constraint on the Zero-size Palette

In order to overcome the issue related to zero-size palette table, another embodiment of the present invention applies a constraint on the palette size conditionally based on whether there is any coded escape pixel in the current palette block (e.g., the current CU). The constraint is applied to avoid the case of zero-size palette when no escape pixel is coded in the current palette block (e.g., the CU-level escape flag, palette_escape_val_present_flag=0). When escape pixels are coded in the current palette block (e.g., the CU-level escape flag, palette_escape_ val_present_flag=1), the constraint is not applied to the palette size.

When the constraint is applied to the palette size, a syntax design according to an embodiment restricts the encoder from generating the bitstream that may result in the palette size being 0. For example, if palette_escape_val_present_flag is equal to 0, a syntax can be designed to directly signal the palette size as shown below.

The value of the syntax palette_size_minus_one for the transmitted palette should be within a range of 0 to maximum palette size minus one, where the syntax palette_size_minus_one indicates a current palette size of the current palette table minus one. The palette size is reconstructed using the following syntax:

Palette_Size=palette_size_minus_one+1.

Another way to avoid the case of palette size being equal to 0 is to directly restrict the size of the palette from being zero semantically. For example, an encoder may include such constraint during encoding process. Consequently, any bitstream that may result in the palette size for a coding block (coding unit, prediction unit) being equal to 0 is regarded as a non-conforming bitstream.

In JCTVC-O0218, a CU-level escape flag, palette_escape_val_present_flag, is first signaled. Information for reuse flags is signaled to indicate the number of major colors in the predictor reused. Then, a new color size is coded to indicate the number of new colors signaled. To avoid the case of zero-size palette, if palette_escape_val_present_flag is equal to 0 (i.e., no escape pixel in the block) and reused color size is zero, the new color size cannot be zero, the new color size minus one is signaled. The value of the new color size minus one will be restricted to be 0 or larger. The actual new color size is equal to the parsed new color size plus one. An exemplary constraint to avoid zero-size palette is shown below:

palette_*num*_signalled_entries=parse_palette_*num*_signalled_entries+(numPredPreviousPalette==0&&
palette_escape_*val*_present_flag==0), where palette_num_signalled_entries is the new color size, parse_palette_num_signalled_entries is the parsed new color size, numPredPreviousPalette is reused color size.

An exemplary syntax table incorporating an embodiment of the present invention is shown in Table 1. The palette_escape_val_present_flag is signaled before parse_palette_num_signalled_entries. Alternatively, the palette_escape_val_present_flag can be signaled before parsing/deriving numPredPreviousPalette.

TABLE 1

```
...
  palette__escape__val__present__flag                             ae(v)
...
  if( numPredPreviousPalette < max__palette__size)
      parse__palette__num__signalled__entries                     ae(v)
  palette__num__signalled__entries =
  parse__palette__num__signalled__entries +
    ( numPredPreviousPalette == 0 &&
    palette__escape__val__present__flag == 0)
    for ( cIdx = compOffset; cIdx < NumComp + compOffset;
    cIdx++ )
      for( i = 0; i < palette__num__signalled__entries; i++ )
        palette__entries[ cIdx ][ numPredPreviousPalette + i ]    ae(v)
      palette__size = numPredPreviousPalette +
      palette__num__signalled__entries
  }
...
  if( escape__val__present__flag )
      indexMax = palette__size
  else
      indexMax = palette__size − 1
```

Conditional Signaling of CU-level Escape Flag

In the existing SCM-2.0, when the predicted palette size from the previous palette table (the size of predicting palette) and the new palette size (the size of new transmitted palette) are all zero, all the pixels may still be encoded as escape pixels, where a major color index equal to zero represents the escape pixel. In other words, if the predicted palette size and the new palette size are all zero, the CU-level escape flag should be 1, which indicates that there are escape pixels/indices in this CU.

Accordingly, in one embodiment, the CU-level escape flag is not signaled and is inferred as 1 instead if the palette size of the current palette table of the current CU is zero. The palette size of the current palette table can be determined by the sum of the predicted palette size and the new palette size, so the CU-level escape flag is not signaled and is inferred as 1 if the predicted palette size and the new palette size are all zero. Alternatively, the palette size of the current palette table may relate to the previous palette table of a last palette-coded CU. For example, the palette size of the current palette table is equal to the palette size of the previous palette table. In this case, the CU-level escape flag is not signaled and is inferred as 1 if the palette size of the previous palette table is zero.

In SCM-2.0, a palette sharing flag is signaled to indicate that the palette entries of current CU are copied from the last coded palette CU. However, the CU-level escape flag is independent from palette sharing flag. The CU-level escape flag is always signaled in the palette-coded CU. However, according to the concept of palette sharing, a current palette should inherit the palette entries from last palette-coded CU including the CU-level escape flag. Therefore, if the palette sharing flag is equal to 1 (i.e., palette sharing asserted), the CU-level escape flag is not signaled and is inferred as the last coded CU-level escape pixel presence flag instead.

In another embodiment, if the predicted palette size and the new palette size are all zero, the CU-level escape flag is not signaled and is inferred as 1. In yet another embodiment, an encoding constraint is added to conditionally signal the CU-level escape flag. If the predicted palette size and the new palette size are all zero, the CU-level escape flag is constrained to be 1. Otherwise, the bitstream is not a conformance/legal bitstream.

The CU-level escape can be signaled before the new palette size. If the predicted palette size is zero and the CU-level escape flag is 0, the new palette size is constrained to be larger than 0. Otherwise (i.e., the new palette size=0), the bitstream is not a conformance/legal bitstream.

In SCM-2.0, the escape pixels are signaled by using an escape index. However, the escape pixels can be signaled by using an explicit flag instead. For example, before palette index signaling, a pixel-level escape flag can be signaled to indicate whether the current pixel is an escape pixel. If the flag is 1, the current pixel is an escape pixel. The escape values of each component (and run) are signaled. Otherwise (i.e., the pixel-level escape flag=0), the palette index and run are signaled.

If the pixel-level escape flag is used and the predicted palette size and the new palette size are all zero, the pixel-level escape flags should be all 1. Therefore, in another embodiment, if the pixel-level escape flags are used and the predicted palette size and the new palette size are all zero, then none of the pixel-level escape flags is signaled and the pixel-level escape flags are inferred as 1 instead. In yet another embodiment, an encoding constraint can be added for conditional escape flag signaling. If the pixel-level escape flags are used and the predicted palette size and the new palette size are all zero, the pixel-level escape flags are constrained to be 1. Otherwise, the bitstream is not a conformance/legal bitstream.

In SCM-2.0, an indexMax parameter is defined to indicate the maximum palette index of current CU. The definition of indexMax is as follows.

TABLE 2

| | Descriptor |
|---|---|
| palette_coding( x0, y0, nCbS ) { | |
| ...... | |
| if( palette_escape_val_present_flag ) | |
| indexMax = palette_size | |
| else | |
| indexMax = palette_size − 1 | |
| ...... | |
| } | |

The indexMax depends on whether an escape value is present in the palette (i.e., palette_escape_val_present_flag) and also depends on the paletter size (i.e., palette_size). The indexMax should be an integer that is equal to or larger than 0. If the indexMax is smaller than 0, it means there is no palette for the current CU. The decoder cannot parse and reconstruct the current palette coded CU. Since the palette_size is an integer equal to or larger than 0, the indexMax can be smaller than 0 only when both palette_size and palette_escape_val_present_flag are equal to 0. The palette size is equal to 0 when palette_share_flag, numPredPreviousPalette and num_signalled_palette_entries are all equal to zero or when palette_share_flag is equal to 1 and previous palette size is equal to 0.

In order to constraint the indexMax value to be equal to or larger than 0, several embodiments are disclosed for palette_escape_val_present_flag_coding.

embodiment-1: Eencoder constraint for palette_escape_val_present_flag coding

If palette_size is equal to 0, the palette_escape_val_present_flag is constrainted to be 1. Otherwise, the bitstream is not a conformance/legal bitstream.

embodiment-2: Syntax constraint for palette_escape_val_present_flag coding

If palette_size is equal to 0, the palette_escape_val_present_flag is inferred to be 1. The signaling of palette_escape_val_present_flag can be skipped in this case.

The syntax table in Table 2 can be modified as below in Table 3. A palette size checking (i.e., "if (palette_size>0)") is added according to an embodiment of the present invention.

TABLE 3

| | Descriptor |
|---|---|
| palette_coding( x0, y0, nCbS ) { | |
| ...... | |
| if(palette_size > 0 ) | |
| palette_escape_val_present_flag | ae(v) |
| if( palette_escape_val_present_flag ) | |
| indexMax = palette_size | |
| Else | |
| indexMax = palette_size − 1 | |
| ...... | |
| } | | palette_escape_val_present_flag is inferred to be equal to 1 when not present.

In SCM-2.0, the escape pixels are signaled by using an escape index. However, the escape pixels can be signaled by using an explicit flag instead. For example, before palette index signaling, a pixel-level escape flag can be signaled to indicate whether the current pixel is an escape pixel. If the flag is 1, the current pixel is an escape pixel. The escape values of each component (and run) are signaled. Otherwise (i.e., the pixel-level escape flag=0), the palette index and run are signaled.

If the pixel-level escape flags are used, and the palette size is zero, the pixel-level escape flags should be all 1. Therefore, according to one embodiment, if the pixel-level escape flags are used and the palette size is equal to zero, all the pixel-level escape flags will not be signaled and these flags are inferred as 1 instead.

According to another embodiment, an encoding constraint is added. If the pixel-level escape flags are used and the palette size is zero, the pixel-level escape flags are constrained to be 1. Otherwise, the bitstream is not a conformance/legal bitstream.

Context Modeling of CU-level Escape Flag

In SCM-2.0, the CU-level escape flag is coded with bypass bin. In order to improve the coding efficiency, an embodiment of the present invention uses the context coded bin for the CU-level escape flag in entropy coding.

More than one context can be used for this flag. The context formation of the CU-level escape flag may depend on CU size, CTU size, CU depth, palette size (predicted palette size+new palette size), predicted palette size, new palette size, the CU-level escape flag of last coded palette CU, or the combination of the above information.

For example, the context formation of the CU-level escape flag may depend on the CU size. The context index can be formulated as follow:

$$ctxIdx=(CU\_size==8?\ 0:(CU\_size==16?\ 1:2));\qquad(1)$$

$$ctxIdx=(CU\_size==8?\ 0:1);\ or\qquad(2)$$

$$ctxIdx=(CU\_size==16?\ 0:1).\qquad(3)$$

In other examples, the context formation of the CU-level escape flag may depend on the CU depth and CTU size. The context index can be formulated as follow:

$$ctxIdx=(cu\_depth);\qquad(4)$$

$$ctxIdx=\max(2, cu\_depth);\qquad(5)$$

$$ctxIdx=\max(1, cu\_depth);\qquad(6)$$

$$ctxIdx=\min(0, cu\_depth-1);\qquad(7)$$

$$ctxIdx=\min(0, cu\_depth-2);\qquad(8)$$

$$ctxIdx=\max(2, max\_cu\_depth-cu\_depth);\qquad(9)$$

$$ctxIdx=\max(1, max\_cu\_depth-cu\_depth);\qquad(10)$$

$$ctxIdx=\max(2, (max\_cu\_depth-cu\_depth)>>1);\ or\qquad(11)$$

$$ctxIdx=\max(1, (max\_cu\_depth-cu\_depth)>>1).\qquad(12)$$

The context formation of the CU-level escape flag may also depend on palette size (i.e., predicted palette size plus new palette size). For example, the context index can be formulated as follow:

$$ctxIdx=(palette>=K?\ 0:1).\qquad(13)$$

where $0<=k<=max\_palette\_size$, k is an integer.

The context formation of the CU-level escape flag may depend on the predicted palette size or the new palette size. For example, the context index can be formulated as follow:

$$ctxIdx=(predicted\_palette\_size>=K?\ 0:1),\qquad(14)$$

where 0<=k<=max_palette_size, k is an integer; or $$ctxIdx=(new\_palette\text{-}size>=K?\ 0:1), \quad (15)$$

where 0<=k<=max_palette_size, k is an integer.

The context formation of the CU-level escape flag may depend on the CU-level escape flag of last coded palette CU. For example, the context index can be formulated as follow:

$$ctxIdx=last\_coded\_CU\_esc\_flag. \quad (16)$$

Conditional Constraint on the Palette Size for Removing Redundancy of Coding Major Color Index In another embodiment, the redundancy removal is applied to major color index coding depending on whether the escape pixels are coded for this palette-coded CU. For example, the redundancy removal can depend on the palette_escape_val_present_flag. When no escape pixels are coded in current palette block (i.e., palette_escape_val_present_flag=0), the redundancy removal for major color index coding is applied. If scanPos>0, the max codeword index (i.e., adjustedIndexMax) is equal to indexMax−1. Otherwise, adjustedIndexMax is equal to indexMax. When escape pixels are coded in current palette block (i.e., palette_escape_val_present_flag=1), the redundancy removal for major color index coding is not applied. The max codeword index (i.e., adjustedIndexMax) is equal to indexMax for all scanPos.

FIG. 1 illustrates an exemplary flowchart of a video coding system incorporating palette coding according to an embodiment of the present invention, where size information related to palette size of a current palette table of the current CU is conditionally signaled based on the escape indication flag. The system receives input data associated with a current coding unit (CU) as shown in step 110. The input data corresponds to color pixel data of the current CU at the encoder side. The input data corresponds to compressed data related to the current CU. The input data may be retrieved from memory (e.g., computer memory, buffer (RAM or DRAM) or other media) or from a processor. An escape indication flag regarding whether there is any sample in the current CU coded as an escape pixel is determined in step 120, where the escape indication flag is asserted if there is any sample in the current CU coded as the escape pixel and the escape indication flag is not asserted if there is no sample in the current CU coded as the escape pixel. The size information related to palette size of a current palette table of the current CU is conditionally signaled based on the escape indication flag in step 130.

Figure 2:
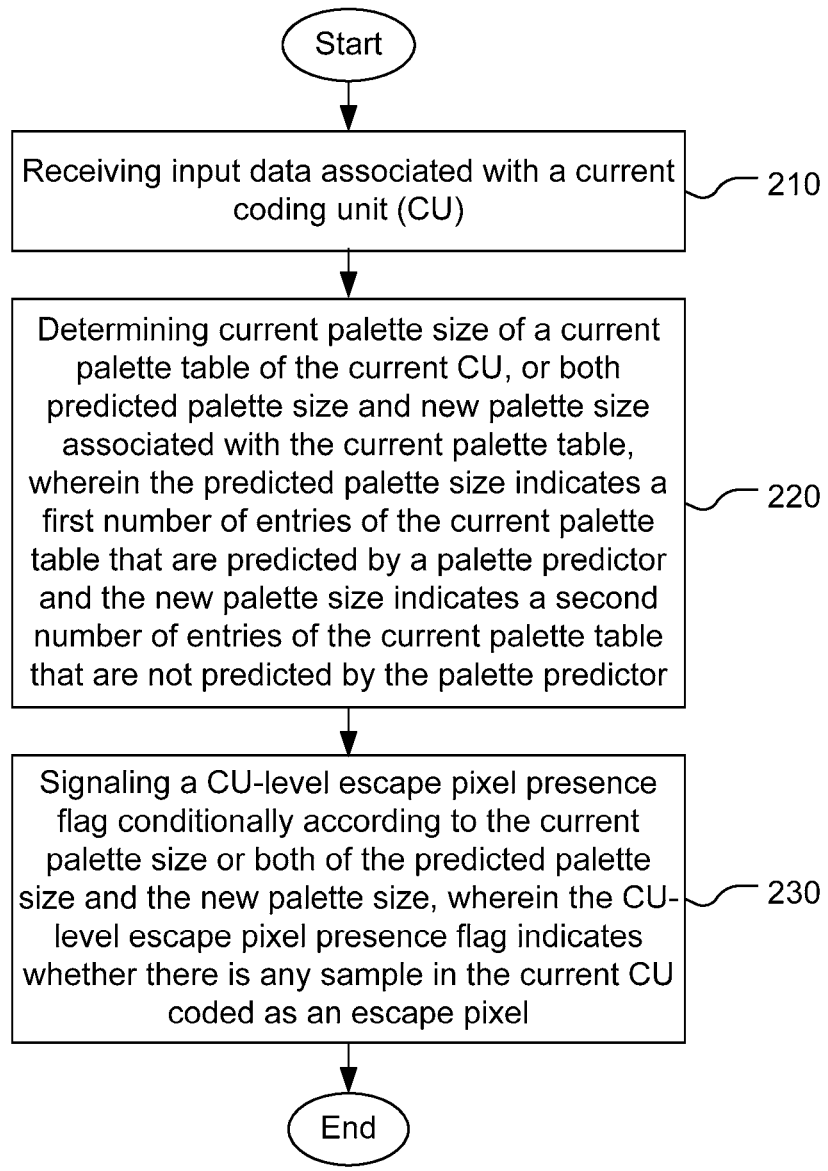
FIG. 2 illustrates an exemplary flowchart of a video coding system incorporating palette coding according to an embodiment of the present invention, where a CU-level escape pixel presence flag is conditionally signaled according to the current palette size or both of the predicted palette size and the new palette size.

FIG. 2 illustrates an exemplary flowchart of a video coding system incorporating palette coding according to an embodiment of the present invention, where a CU-level escape pixel presence flag is conditionally signaled according to the current palette size or both of the predicted palette size and the new palette size. The system receives input data associated with a current coding unit (CU) as shown in step 210. The current palette size of a current palette table of the current CU, or both predicted palette size and new palette size associated with the current palette table are determined in step 220, where the predicted palette size indicates a first number of entries of the current palette table that are predicted by a palette predictor and the new palette size indicates a second number of entries of the current palette table that are not predicted by the palette predictor. A CU-level escape pixel presence flag is conditionally signaled according to the current palette size or both of the predicted palette size and the new palette size in step 230, where the CU-level escape pixel presence flag indicates whether there is any sample in the current CU coded as an escape pixel.

Figure 3:
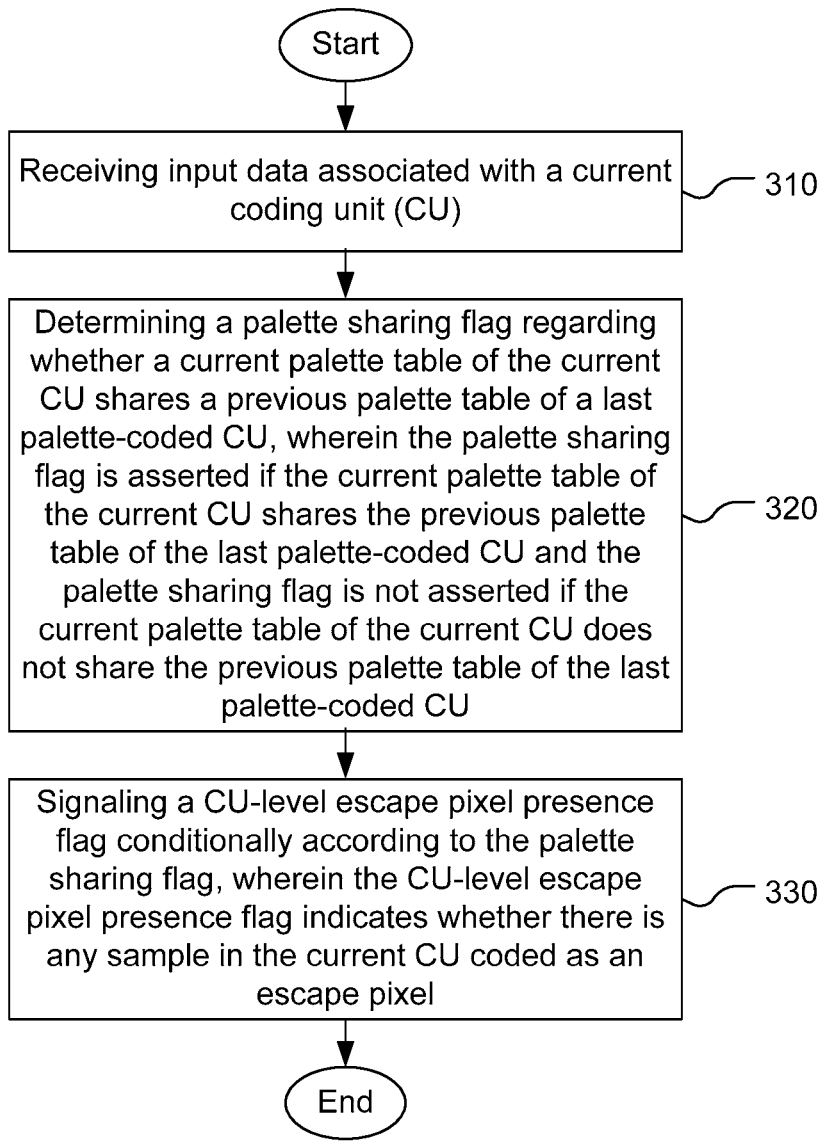
FIG. 3 illustrates an exemplary flowchart of a video coding system incorporating palette coding according to the palette sharing flag.

FIG. 3 illustrates an exemplary flowchart of a video coding system incorporating palette coding according to the palette sharing flag. The system receives input data associated with a current coding unit (CU) as shown in step 310. A palette sharing flag regarding whether a current palette table of the current CU shares a previous palette table of a last palette-coded CU is determined in step 320, where the palette sharing flag is asserted if the current palette table of the current CU shares the previous palette table of the last palette-coded CU and the palette sharing flag is not asserted if the current palette table of the current CU does not share the previous palette table of the last palette-coded CU. A CU-level escape pixel presence flag is conditionally signaled according to the palette sharing flag in step 330, where the CU-level escape pixel presence flag indicates whether there is any sample in the current CU coded as an escape pixel.

The flowcharts shown are intended to illustrate examples of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette coding for a picture, wherein the picture is divided into multiple coding units (CUs), the method comprising:
receiving input data associated with a current coding unit (CU);
determining an escape indication flag regarding whether there is any sample in the current CU coded as an escape pixel, wherein the escape indication flag is asserted if there is any sample in the current CU coded as the escape pixel and the escape indication flag is not asserted if there is no sample in the current CU coded as the escape pixel; and
signaling size information related to palette size of a current palette table of the current CU conditionally based on the escape indication flag, wherein determining the escape indication flag is performed no later than determining the size information,
wherein if the escape indication flag is not asserted and predicted palette size is zero, then a size syntax representing new palette size minus one is signaled for the current palette table, wherein the predicted palette size indicates a first number of entries of the current palette table that are predicted by a palette predictor and the new palette size indicates a second number of entries of the current palette table that are not predicted by the palette predictor, and
wherein an actual new palette size corresponding to the second number of entries of the current palette table that are not predicted by the palette predictor is derived based on the size syntax parsed plus (numPredPreviousPalette ==0 && palette_escape_val_present_flag ==0), wherein numPredPreviousPalette corresponds to a first syntax representing the predicted palette size and palette_escape_val_present_flag corresponds to a second syntax representing the escape indication flag.

2. The method of claim 1, wherein if the escape indication flag is not asserted, a syntax palette_size_minus_one signaled for the current palette table of the current CU is limited to a range from zero to a maximum palette size minus one inclusive, wherein the syntax palette_size_minus_one indicates a current palette size of the current palette table minus one.

3. The method of claim 2, wherein the current palette size is reconstructed according to (palette_size_minus_one +one).

4. The method of claim 1, wherein if the escape indication flag is not asserted and predicted palette size is zero, then new palette size related to the current palette table is restricted to be greater than zero, wherein the predicted palette size indicates a first number of entries of the current palette table that are predicted by a palette predictor and the new palette size indicates a second number of entries of the current palette table that are not predicted by the palette predictor.

5. The method of Claim 1, wherein an actual new palette size corresponding to the second number of entries of the current palette table that are not predicted by the palette predictor is determined according to the size syntax parsed from a bitstream plus one, wherein the bitstream includes coded data of the current CU.

6. The method of claim 1, wherein a size syntax representing new palette size minus one is signaled after the escape indication flag in a bitstream that includes coded data of the current CU.

7. The method of claim 1, wherein a syntax numPredPreviousPalette representing a predicted palette size is signaled after the escape indication flag in a bitstream that includes coded data of the current CU, wherein the predicted palette size indicates a first number of entries of the current palette table that are predicted by a palette predictor.

8. The method of claim 1, wherein the palette size of the current palette table of the current CU is directly restricted to be greater than one by an encoder.

9. The method of claim 8, wherein if a bitstream that results in a decoded palette size of the current palette table being zero is determined as a non-conforming bitstream.

10. A method of palette coding for a picture, wherein the picture is divided into multiple coding units (CUs), the method comprising:
receiving input data associated with a current coding unit (CU);
determining current palette size of a current palette table of the current CU, or both predicted palette size and new palette size associated with the current palette table, wherein the predicted palette size indicates a first number of entries of the current palette table that are predicted by a palette predictor and the new palette size indicates a second number of entries of the current palette table that are not predicted by the palette predictor; and
performing one of:
determining whether or not to signal a CU-level escape pixel presence flag according to the current palette size or both of the predicted palette size and the new palette size and signaling a CU-level escape pixel presence flag according to the determination of whether or not to signal the CU-level escape pixel presence flag, wherein the CU-level escape pixel presence flag indicates whether there is any sample in the current CU coded as an escape pixel; and
determining whether or not to constrain the CU-level escape pixel presence flag to one according to the current palette size or both of the predicted palette size and the new palette size, and constrain the CU-level escape pixel presence flag to one according to the determination of whether or not to constrain the CU-level escape pixel presence flag to one.

11. The method of claim 10, wherein the CU-level escape pixel presence flag is not signaled if the current palette size is zero or both the predicted palette size and the new palette size are zero.

12. The method of claim 11, wherein the CU-level escape pixel presence flag is inferred as one.

13. The method of claim 10, wherein the CU-level escape pixel presence flag is constrained to one if the current palette size is zero or both the predicted palette size and the new palette size are zero.

14. The method of claim 10, wherein the current palette size of the current palette table is set to zero if both the predicted palette size and the new palette size are zero.

15. The method of claim 10, wherein the current palette size of the current palette table relates to a previous palette table of a last palette-coded CU.

16. A video coding system implementing palette coding for a picture, wherein the picture is divided into multiple coding units (CUs), the system comprising:
- a receiver configured to receive input data associated with a current coding unit (CU);
- a processor configured to determine current palette size of a current palette table of the current CU, or both predicted palette size and new palette size associated with the current palette table, wherein the predicted palette size indicates a first number of entries of the current palette table that are predicted by a palette predictor and the new palette size indicates a second number of entries of the current palette table that are not predicted by the palette predictor; and
- the processor further configured to perform one of:
- determining whether or not to signal a CU-level escape pixel presence flag according to the current palette size or both of the predicted palette size and the new palette size and signaling a CU-level escape pixel presence flag according to the determination of whether or not to signal the CU-level escape pixel presence flag, wherein the CU-level escape pixel presence flag indicates whether there is any sample in the current CU coded as an escape pixel; and
- determining whether or not to constrain the CU-level escape pixel presence flag to one according to the current palette size or both of the predicted palette size and the new palette size, and constrain the CU-level escape pixel presence flag to one according to the determination of whether or not to constrain the CU-level escape pixel presence flag to one.

* * * * *